United States Patent [19] [11] 3,902,890
Sanmiya et al. [45] Sept. 2, 1975

[54] REFINING SILVER-BEARING RESIDUES

[75] Inventors: Tei Stewart Sanmiya, Lively; Derek George Kerfoot, Pierrefonds; Robert Ray Matthews, Lively, all of Canada

[73] Assignee: The International Nickel Company, Inc., New York, N.Y.

[22] Filed: Sept. 21, 1973

[21] Appl. No.: 399,638

[30] Foreign Application Priority Data
Mar. 12, 1973 Canada.............................. 165863

[52] U.S. Cl. .......................... 75/24; 75/63; 75/83; 75/93 A; 75/93 E; 75/93 G; 423/509
[51] Int. Cl.² .................... C22B 11/02; C01B 19/00
[58] Field of Search............ 75/24, 83, 93 E, 93 G, 75/63; 423/48, 509

[56] References Cited
UNITED STATES PATENTS

| | | | |
|---|---|---|---|
| 486,613 | 11/1892 | Langguth | 75/83 |
| 597,139 | 1/1898 | Carpenter | 75/83 |
| 918,908 | 4/1909 | Pryor | 75/83 |
| 1,004,676 | 10/1911 | Neilly | 75/83 X |
| 2,131,072 | 9/1938 | Reid | 75/83 |
| 2,218,250 | 10/1940 | Reid | 75/83 |
| 2,775,509 | 12/1956 | Lebedeff et al. | 423/509 |
| 2,944,886 | 7/1960 | Fisher et al. | 75/83 |
| 2,948,591 | 8/1960 | Handwerk et al. | 423/509 |
| 3,249,399 | 5/1966 | Hoffmann et al. | 423/509 X |
| 3,627,486 | 12/1971 | Nakano | 423/509 |

*Primary Examiner*—Allen B. Curtis
*Assistant Examiner*—Thomas A. Waltz
*Attorney, Agent, or Firm*—Francis J. Mulligan, Jr.; Ewan C. MacQueen

[57] ABSTRACT

A process for refining smelted, silver-bearing residues (i.e. mattes) wherein as a first step oxygen or oxygen-enriched-air is injected into the molten matte to slag off base metal impurities and oxidize selenium and tellurium. In a second step oxidation is continued in the presence of a flux to reduce copper content of the thus-produced silver bullion to less than about 1% by weight.

2 Claims, No Drawings

REFINING SILVER-BEARING RESIDUES

The present invention is concerned with the treatment of smelted silver bearing residues herein referred to as silver matte and, more particularly with the treatment of silver matte to upgrade the silver, gold and platinum group metals content of the matte in a manner which minimizes pollution of the environment.

As produced in some mineral treatment operations, silver matte contains greater than about 50% silver, small amounts of base metal such as copper, nickel and lead, small but significant amounts of gold and platinum group metals and major amounts of selenium and tellurium. In the past such matte has been successfully upgraded by injecting air along with solid sodium nitrate into the molten matte. This treatment results in the formation of water-soluble selenates and tellurates. As a by-product however, the prior art process produces a gaseous effluent rich in nitrogen dioxide. This gas is toxic and is difficult to remove economically from the gaseous effluent. Furthermore, the prior art process produces large amounts of slag of high sodium content. The high sodium content is a problem because when selenium and tellurium are recovered from the slags an appreciable quantity of the sodium precipitates as acidic sodium salts thus presenting a disposal problem.

It has now been discovered that by means of a special process silver matte can be upgraded to silver bullion suitable for further electrorefining while minimizing water and air pollution.

It is an object of the present invention to provide a novel, effective and economical process for upgrading silver matte while minimizing water and air pollution.

Other objects and advantages will become apparent from the following description.

Generally speaking, the present invention contemplates a process comprising initially injecting oxygen or a gas, such as air enriched in oxygen to contain preferably greater than 50% oxygen by volume, into a silver matte while the matte is held at a temperature of about 1,090° to about 1,260°C. to oxidize base metals and selenium and tellurium and specifically to lower the copper content of the thus resultant bullion to less than about 4% by weight and thereafter injecting oxygen, air or gas such as air enriched in oxygen into the molten bullion in the presence of molten flux made up of a mixture ideally of about 75 parts by weight of commercial borax and about 25 parts by weight of silica (sand) to provide a bullion containing less than about 1% copper suitable for electro-refining.

In the initial oxidation step base metals such as copper, nickel, lead and others present in the matte are oxidized and form a slag on the surface of the matte-bullion. At the same time, selenium and some tellurium will form volatile oxides which exit from the furnace in which the matte (or bullion) is melted or produced, along with exiting gases. The selenium and tellurium oxides can then be recovered from the gas stream upon cooling to below about 200°C. by scrubbing or other means well known to those skilled in the art. As an optional step, after the base metal slag has been skimmed from the matte-bullion surface, an alkaline flux, e.g., a flux made up of sodium carbonate (commercial soda ash) can be injected into the matte-bullion with air and the oxidizing gas injection carried on in the presence of this flux to selectively further reduce the content of tellurium in the matte bullion. It is to be noted that in this specification and claims the composite word "matte-bullion" is used to identify the product which is present during the initial oxidation and which is intermediate between the silver matte originally present and the bullion resulting from the initial oxidation. As a general rule some matte treated in accordance with the process of the present invention can contain up to about 30% by weight total selenium and tellurium. The bullion product of the initial oxidation, in the absence of an alkaline slag, contains less than about 2% by weight total selenium and tellurium. When an alkaline slag is present, after the initial oxidation, the total content of selenium and tellurium in the product bullion can be reduced to less than 0.1% by weight. However, this low content of selenium and tellurium can be attained only at a cost of introducing some sodium (or other alkali or alkaline earth metal) into the process water, assuming of course that there is a subsequent hydrometallurgical recovery of selenium and tellurium from the slag.

The second oxidation, comprising injection of oxygen, air or mixtures thereof into the bullion in the presence of a borax-silica flux advantageously is carried out immediately after the first oxidation in order to conserve heat. Any slag or flux from the first oxidation is skimmed from the surface of the bullion and replaced with the borax-silica mixture. Typically, the bullion product of the first step contains up to 3 or 4% by weight of copper and other base metals and upwards of about 85 to 90% silver. The second oxidation carried out in the presence of flux at a temperature of about 1,120°, to about 1,260°C. typically results in a product containing less than about 1% by weight of base metal, usually greater than about 90% silver and assuming that no alkaline flux was used in the first oxidation step, about 0.2–0.6% total selenium and tellurium.

Compared to the prior process of refining silver matte described hereinbefore, the present process eliminates non-recoverable or difficulty recoverable toxic gases from the effluent gas stream and reduces the sodium input to the system markedly, i.e., when an alkaline slag is avoided in the first operation, by about 90%. Furthermore, the total weight of slag produced is markedly reduced with consequent economies in furnace operation and slag handling.

In order to give those skilled in the art a better understanding and appreciation of the invention, the following examples are given.

EXAMPLE I

A charge of about 1820 kilograms of silver matte containing in per cent by weight about 7.9% coper, 1.5% nickel 57.1% silver, about k7.2% lead, about 19.1% selenium and about 9.8% tellurium was introduced into a furnace and heated to about 1,200°C. to melt the charge. Oxygen enriched air was then injected into the molten charge for about 20.3 hours at concentrations in the range from 20–100% oxygen by volume; the longest periods at about 50% and 100% oxygen by volume.

On completion of this initial oxidation a sample of the resultant bullion assayed in per cent by weight 2.8% copper, a trace each of nickel and lead, 90.8% silver, 0.1% selenium and 0.6% tellurium. The oxygen-refined bullion was then covered with a 75% borax, 25% silica flux and oxidation was continued for about 7.5 hours. Upon early termination of this second oxidation-fluxextraction operation the bullion assayed in per cent by weight about 1.8% copper, a trace each of nickel and lead, about 92.8% silver and 0.06% selenium and about 0.1% tellurium. The silver recovered as bullion in this example was about 85.6% of that present in the original matte and the final bullion was suitable for further electrorefining. Further borax-silica fluxing of a sample of this material, in the laboratory, reduced the copper content of the bullion to less than 0.4% by weight.

EXAMPLE II

About 11,000 kilograms of silver matte containing in per cent by weight 6.2% copper, 0.1% nickel, 60.7% silver, 19.3% selenium, 5.7% tellurium and 0.1% lead was treated by oxygen injection at a bath temperature near 1,200°C. During this first stage oxidation, additional silver matte of the above composition and amounting to about 14,000 kilograms was charged to the furnace intermittently and coinciding with slag removal. Oxygen injection, totalling 56.4 hours, produced a matte-bullion assaying in per cent by weight 2.9% copper, 87.6% silver, 1.2% tellurium and about 0.2% selenium.

The bath was covered with a flux consisting of 75 parts borax and 25 parts silica, followed by air injection and was then skimmed. This operation was repeated several times. Air injection time amounted to 22.8 hours. The final bullion assayed in per cent by weight 0.98% copper, 88.8% silver and 0.61% tellurium; the balance consisting mainly of gold and other precious metals.

EXAMPLE III

A quantity of silver matte totalling about 11,000 kilograms and assaying in per cent by weight 7.8% copper, 1.8% nickel, 51.3% silver, 22.3% selenium, 4.5% tellurium and 5.9% lead was injected with oxygen for 22.4 hours at a temperature near 1,200°C. The resulting matte-bullion assayed in per cent by weight 3.72% copper, 84.7% silver, 1.9% tellurium and about 0.2% selenium.

Two 500 pound charges of soda ash injected into the bath followed by oxygen injection for 2.7 hours lowered the tellurium content to less than 0.1% by weight with minor changes in the concentration of other constituents. The copper was lowered to less than 1% by weight by conventional fluxing.

As demonstrated in the foregoing examples the times of oxidation are relatively short being of course dependent upon among other things, weight of the matte or metal, impurity content of matte, per cent by volume of oxygen in the injected gas, available surface for gas matte or metal interaction and volume of gas introduced into the furnace. In usual practice oxidation in each step does not need to be carried out for longer than about 30 hours. Although air itself or only slightly enriched in oxygen, i.e., gas containing at least about 20% by volume of oxygen can be used as oxidizer, the inert nitrogen exerts a cooling effect which must be offset by an increase in auxiliary heating. At oxygen levels of at least 50% by volume, burner settings can be used which were conventional with prior art nitre refining.

The process of the present invention can be carried out in any suitably lined container but, on a large scale, is advantageously carried out in a rotary furnace with tuyeres or in a reverberatory type furnace fitted with a suitable lance. The lining of the vessels, containers or furnaces should be resistant to the presence of an oxidizing atmosphere and the presence of base metal slags and borax-silica flux. Experiments have shown that the 75 borax — 25 silica flux mentioned in Examples I and II is near optimum for the purpose intended i.e., collection of copper oxide while retaining ease of skimming, low aggressiveness to furnace linings and low pollution potential. Other operable flux ingredients and fluxes which can be used but which may have some disadvantages are sodium nitrate and sodium peroxide (without oxygen injection) and soda ash, soda-borosilicate and lime borosilicate. Generally, silver recovery in the bullion product of the process of the present invention is about 85 to 90%, the balance of the silver being essentially all recoverable from slags and flue deposits.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for recovering values from silver matte containing greater than about 50% by weight of silver, base metal from the group consisting of copper, nickel, lead and small amounts of gold and platinum group metals with up to about 30% by weight of at least one element selected from the group consisting of selenium and tellurium, comprising injecting a gas selected from the group consisting of oxygen and air enriched with oxygen to at least about 50% by volume into said silver matte held molten at a temperature of about 1,090°C to about 1,260°C in the absence of a flux to oxidize and volatilize selenium and tellurium so as to provide a matte containing at most about 0.6% by weight total selenium and tellurium, recovering at least one material selected from the group of oxidized selenium and tellurium from the gaseous effluent from said gas injection process, continuing said gas injection process in the absence of a flux until the matte is converted to bullion containing at least about 85% by weight of silver, skimming any base-metal slag from the surface of the molten bullion, adding a borax-silica flux and continuing oxidation while the molten bullion is in contact with said borax-silica flux until the copper content of the bullion is less than 1% by weight to provide a silver rich bullion containing gold and platinum group metals and suitable for electrorefining.

2. A process as in claim 1 wherein after base-metal slag is skimmed from said bullion, oxidation is carried out while the molten bullion is in contact with soda ash flux and, thereafter, the soda ash flux is removed prior to addition of the borax silica flux.

* * * * *